US006917299B2

(12) United States Patent
Fu et al.

(10) Patent No.: US 6,917,299 B2
(45) Date of Patent: Jul. 12, 2005

(54) POINT OF SALE (POS) TERMINAL SECURITY SYSTEM

(75) Inventors: Shuzhen Fu, Roseville, CA (US); David C. Hanley, Granite Bay, CA (US); Raymond A. DeBruin, Auburn, CA (US); Jack R. Grenfell, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 36 days.

(21) Appl. No.: 10/377,188

(22) Filed: Feb. 28, 2003

(65) Prior Publication Data

US 2003/0137416 A1 Jul. 24, 2003

Related U.S. Application Data

(63) Continuation of application No. 09/586,678, filed on Jun. 1, 2000, now Pat. No. 6,646,565.

(51) Int. Cl.$^7$ .............................................. G08B 21/00
(52) U.S. Cl. ..................... 340/686.1; 340/3.3; 340/652; 340/653; 340/687; 361/736
(58) Field of Search ........................... 340/686.1, 568.1, 340/657, 660, 661, 663, 572.8; 326/8

(56) References Cited

U.S. PATENT DOCUMENTS

| | | | |
|---|---|---|---|
| 3,772,674 A | * 11/1973 | Jackson ................... | 206/459.1 |
| RE31,114 E | 12/1982 | Berg | |
| 4,593,384 A | 6/1986 | Kleijne | |
| 5,117,457 A | 5/1992 | Comerford et al. | |
| 5,123,851 A | * 6/1992 | Young et al. .................. | 439/67 |
| 5,233,505 A | 8/1993 | Chang et al. | |
| 5,675,319 A | 10/1997 | Rivenberg et al. | |
| 5,938,472 A | 8/1999 | Yuen et al. | |
| 6,065,679 A | 5/2000 | Levie et al. | |
| 6,501,390 B1 | * 12/2002 | Chainer et al. ........ | 340/870.16 |

FOREIGN PATENT DOCUMENTS

| EP | 0924592 A2 | 6/1999 |
|---|---|---|
| WO | WO99/40501 | 12/1999 |

* cited by examiner

Primary Examiner—Thomas J. Mullen, Jr.
Assistant Examiner—Son Tang

(57) ABSTRACT

A security system for electronic circuits (e.g. electronic circuits contained within a secure POS terminal) is provided that is both more tamper resistant, and tamper responsive and less expensive than the prior art epoxy potting. This is achieved by inserting an electrical connector between a first and a second circuit board contained within a case of the POS terminal. The first and the second circuit boards are any type of circuit board known in the art, including both not limited to, rigid circuit boards, flexible circuit boards, printed circuit boards, etc. If the case is opened the connector no longer provides an electrical connection between the first and the second circuit boards, triggering a tamper detection circuit. In some embodiments of the invention, a flexible conductive film is wrapped around the circuit boards and the connector. If a tamperer attempts to penetrate the case of the POS terminal to disable the tamper detection circuit, the circuit on the flexible security film is interrupted, in turn triggering the tamper detection circuit. As a result, the secure POS terminal of the present invention overcomes the limitations of prior art potted terminals. By eliminating the potting process, in fact, the cost of manufacturing the terminal is reduced and there is no need for a special ventilation system. In addition, the circuitry within the terminal can be accessed for repair and maintenance purposes.

54 Claims, 13 Drawing Sheets

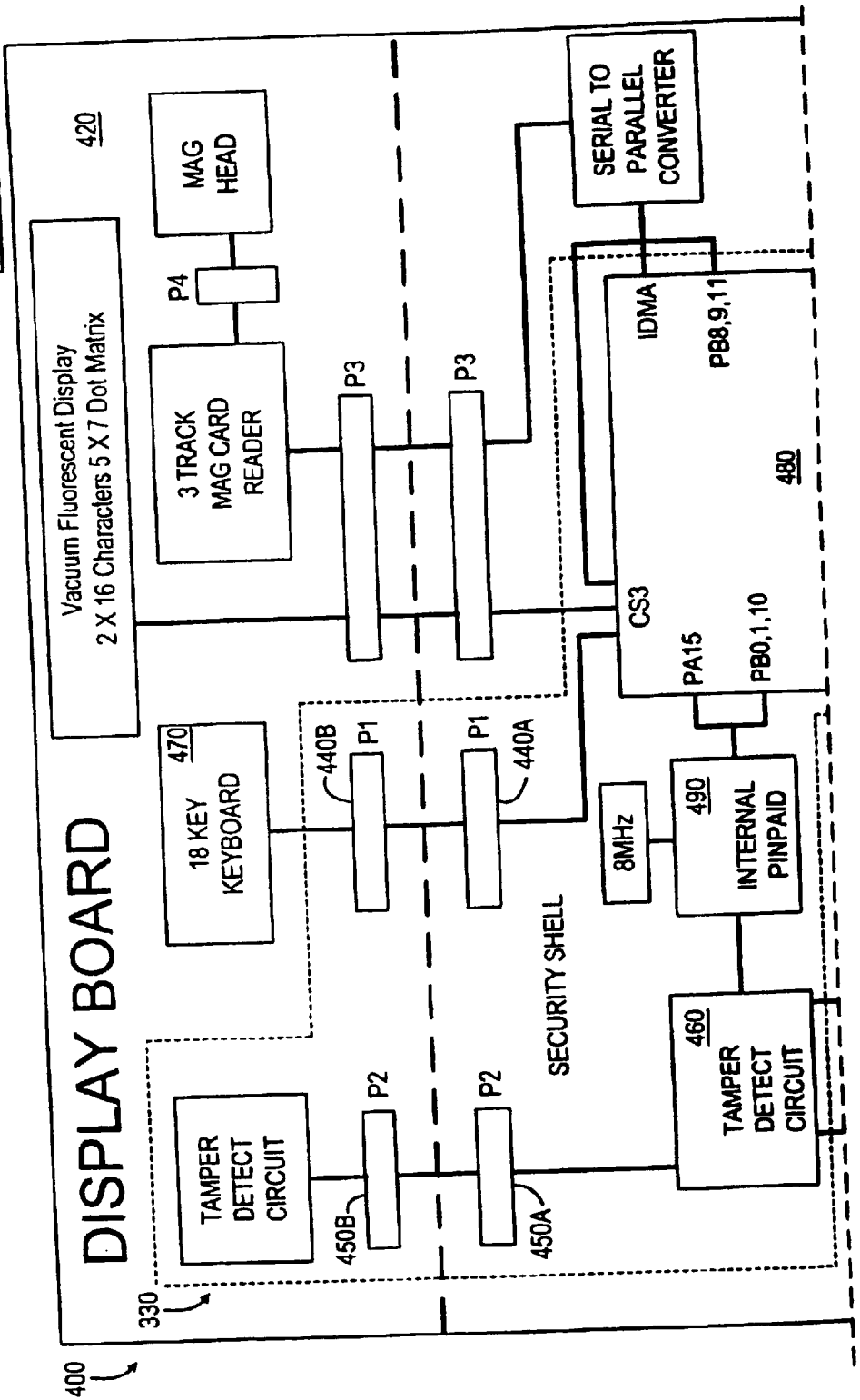

CLIP PORTION

POINT OF SALE (POS) TERMINAL SECURITY SYSTEM

CROSS REFERENCE TO RELATED APPLICATION(S)

This application is a continuation of patent application having Ser. No. 09/586,678 filed Jun. 1, 2000 now U.S. Pat. No. 6,646,565, which is hereby fully incorporated herein by reference. Benefit of all earlier filing dates is claimed for all common subject matter.

BACKGROUND OF THE INVENTION

1. Field of the Invention

The present invention relates generally to security systems and, more specifically, to security systems for electronic circuits.

2. Related Art

Point of sale (POS) terminals allow customers to make payments using a variety of payment instruments such as credit cards, debit cards, smart cards, ATM cards, etc. To ensure that the payment information transmitted from the POS terminals to a payment center is not intercepted, this information is typically encrypted and secured through other means (e.g., digital authentication) during transmissions.

However, confidential payment information entered by the user into the POS terminal could still be intercepted by tampering with the POS terminal. To curb such interception and any tampering of the keypad and processor, processors and other circuitry in the POS terminal are typically embedded in material such as epoxy resin which is potted to the keypad, thereby integrating the keypad and the circuits into a single module.

A cross-section of a typical prior art potted POS terminal 100 is shown in FIG. 1. Potted POS terminal 100 includes a top case 110, a bottom case 120, keys 130 and security components 140. The circuitry within POS terminal 100 is enclosed within a PCB 160 and potted in an epoxy compound 150. Security components 140 are connected to and detect any interruption in PCB 160. In an attempt to drill through PCB 160, the PCB circuit would be interrupted and a detection circuit would trigger a security response (e.g. erasing any confidential information stored in the circuitry of POS terminal 100).

While these security measures are sufficient to deter some tamperers, they could still be circumvented (e.g. by opening the POS terminals and using appropriate chemical substances to remove the potting material).

In addition, epoxy potting is expensive and prevents both authorized and unauthorized access to the circuitry within the POS terminal. For example, once a circuit is potted it can no longer be accessed for repair and maintenance purposes. This has the undesirable effect of increasing repair and replacement costs and, at least potentially, of reducing manufacturing yields. Furthermore, the epoxy potting process is both lengthy and generates fumes that must be removed by a special ventilation system.

As a result, there is a need for a less expensive, more secure technique for preventing unauthorized access to the circuitry within a POS terminal.

SUMMARY OF THE INVENTION

The system and method of the present invention provide a security system for electronic circuits (e.g. the electronic circuits within a secure POS terminal) that is both more tamper resistant and less expensive than the prior art epoxy potting. This is achieved by inserting an electrical connector between a first and a second circuit board contained within a case of the POS terminal. The first and the second circuit boards are any type of circuit board known in the art, including but not limited to, rigid circuit boards, flexible circuit boards, printed circuit boards, etc. If the case is opened the connectors no longer provide an electrical connection between the first and the second circuit boards, triggering a tamper detection circuit.

In some embodiments of the invention, a flexible conductive film is wrapped around the circuit boards and the connector. If a tamperer attempts to drill through the case of the POS terminal to disable the tamper detection circuit, the circuit on the flexible security film is interrupted, in turn triggering the tamper detection circuit.

As a result, the secure POS terminal of the present invention overcomes the limitations of prior art potted terminals. By eliminating the potting process, in fact, the cost of manufacturing the terminal is reduced and there is no need for a special ventilation system. In addition, the circuitry within the terminal can be accessed for repair and maintenance purposes.

BRIEF DESCRIPTION OF THE DRAWINGS

FIGS. 4A and 4B are a block diagram of the circuitry within the POS terminal of FIG. 2.

DETAILED DESCRIPTION OF THE INVENTION

Figure 1:
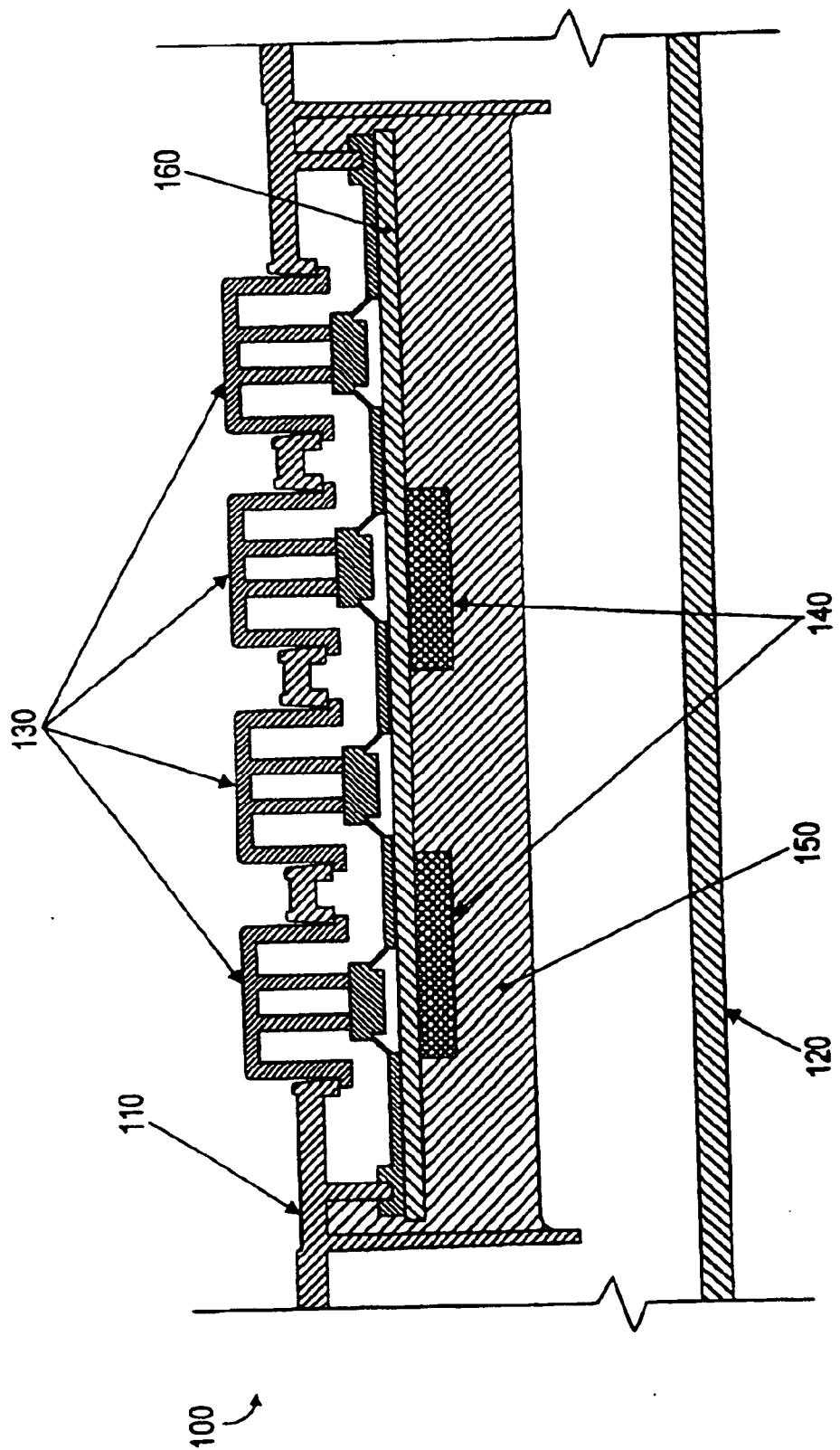
FIG. 1 is a cross-section of a prior art POS terminal.
Figure 2A:
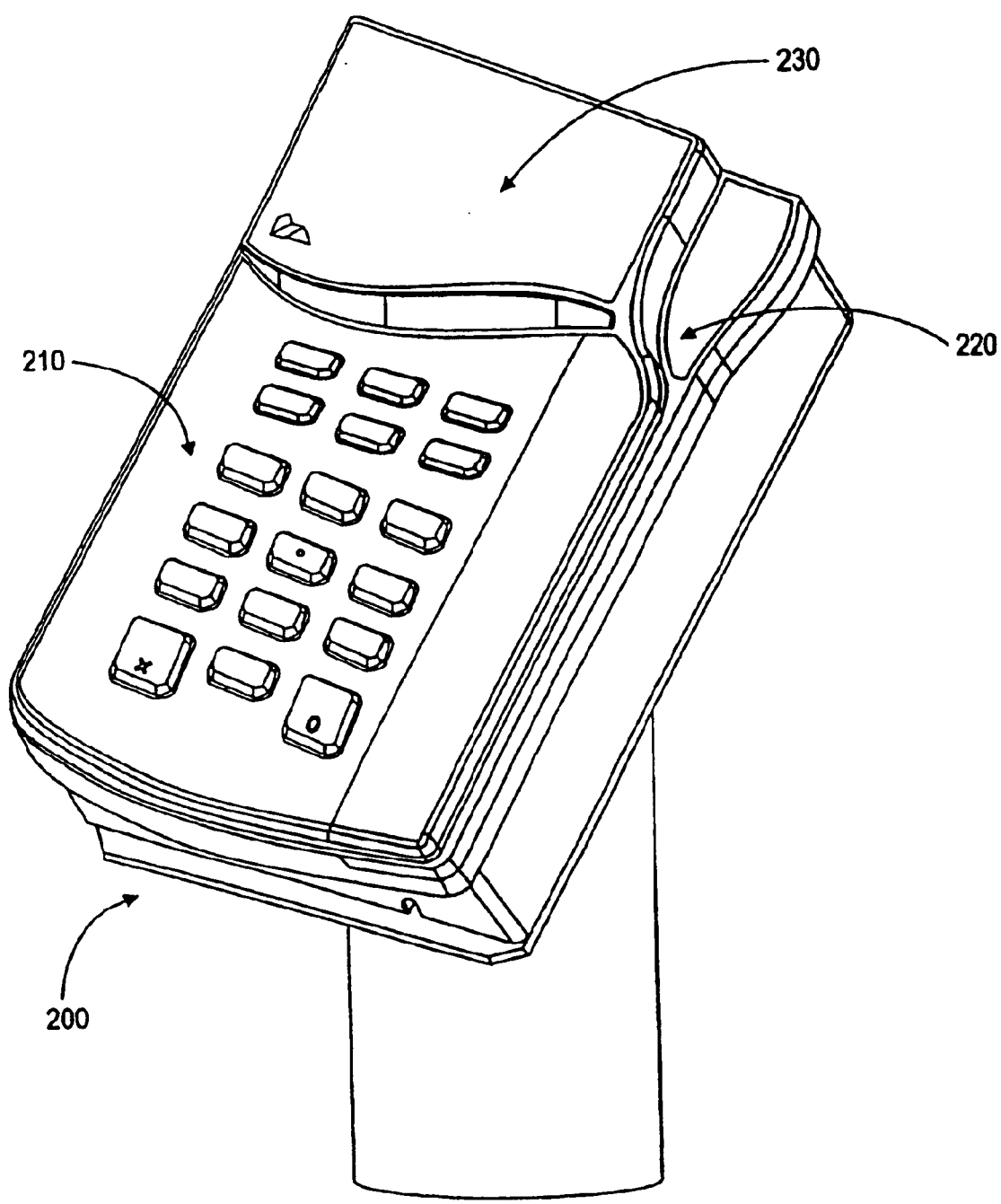
FIG. 2A shows a POS terminal, in accordance to an embodiment of the present invention.

A secure POS terminal 200, in accordance with an embodiment of the invention, is shown in FIG. 2A. Secure POS terminal 200 includes a keypad 210, a card reader 220 and a display 230. To perform a payment transaction, a user of secure POS terminal 200 slides a card through card reader 220. The transaction details are then displayed to the user on display 230. The user can then enter additional information regarding the transaction, such as a security verification code or a PIN number via keypad 210. The information entered by the user is encrypted and transmitted through a secure communication channel to a bank or other transaction clearinghouse. Once the transaction is approved, the user is notified via display 230.

Figure 2B:
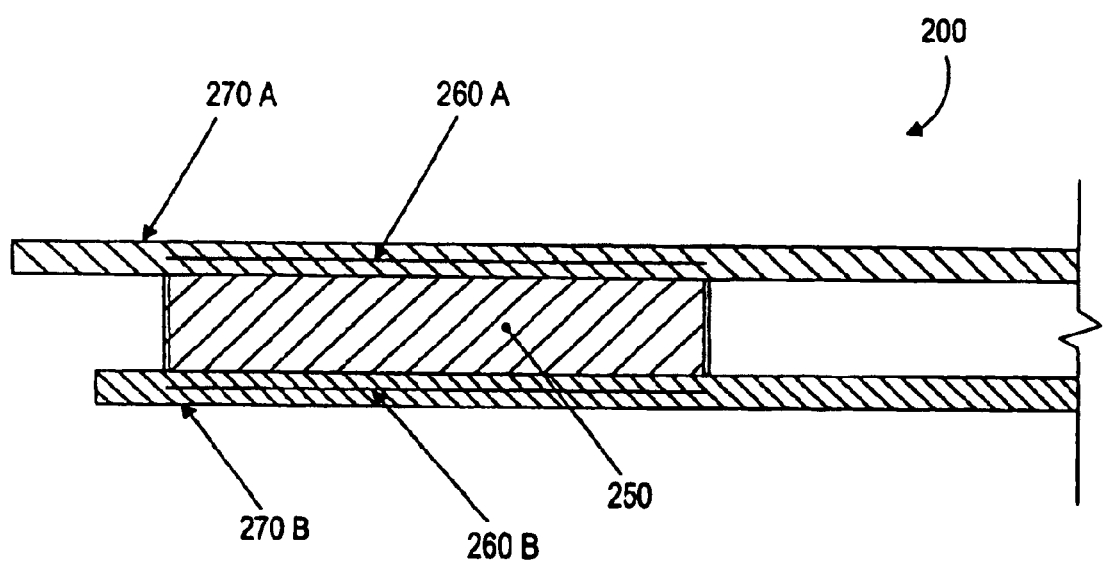
FIG. 2B is a cross-section of the POS terminal of FIG. 2A.

A cross-section of secure POS terminal 200 is shown in FIG. 2B. The circuitry that receives, stores and processes confidential information within POS terminal 200 is encased within security fence module 250. If security fence module 250 is penetrated, a security response is triggered deleting any confidential information contained within secure POS terminal 200. In addition, PCBs 260A and 260B are constructed with an inner serpentine trace layer and auxiliary security components 270A and 270B, which are functional components of secure POS terminal 200, are positioned to provide a complete enclosure to security fence module 250 (e.g. on top and on the bottom of security fence module 250). Those skilled in the art realize that arrangements other than the ones described herein could be employed. For instance, if security fence module 250 were positioned in a vertical dimension, PCBs 260A and 260B could be positioned on the left and the right of security fence module 250, again to provide a complete enclosure.

Figure 3A:
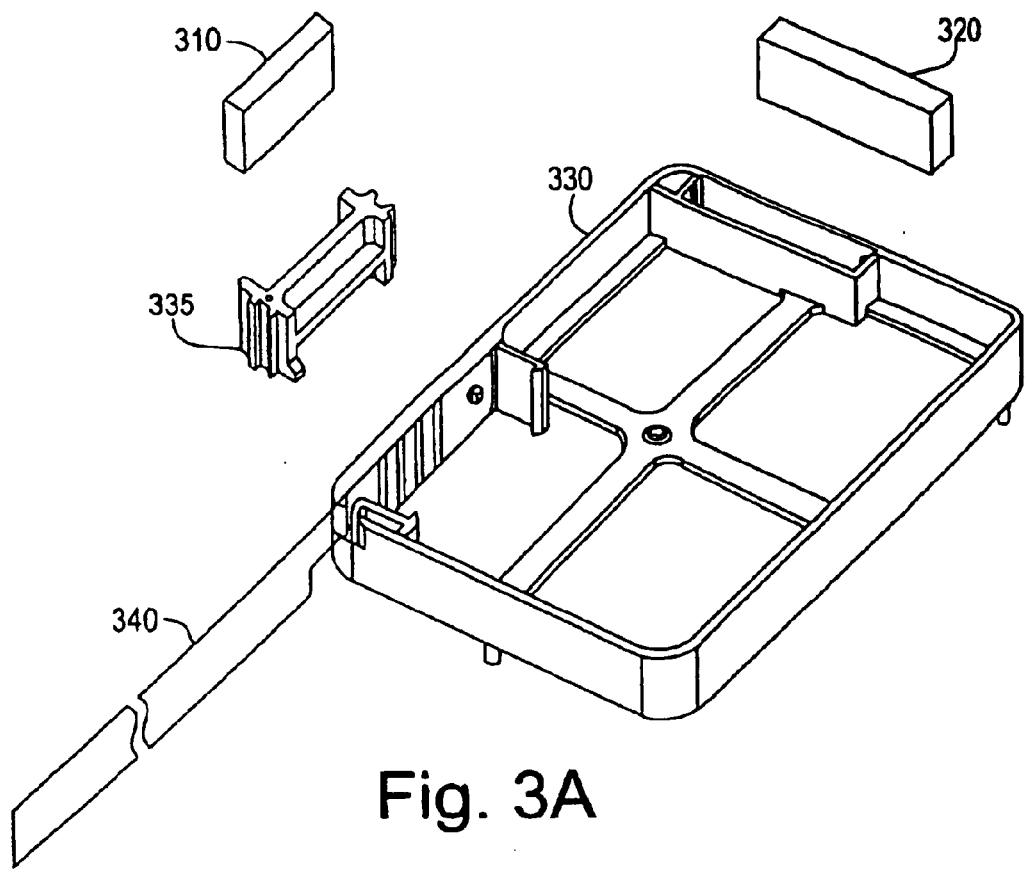
FIG. 3A is a diagram illustrating the components of a security fence module, in accordance with an embodiment of the invention.
Figure 3B:
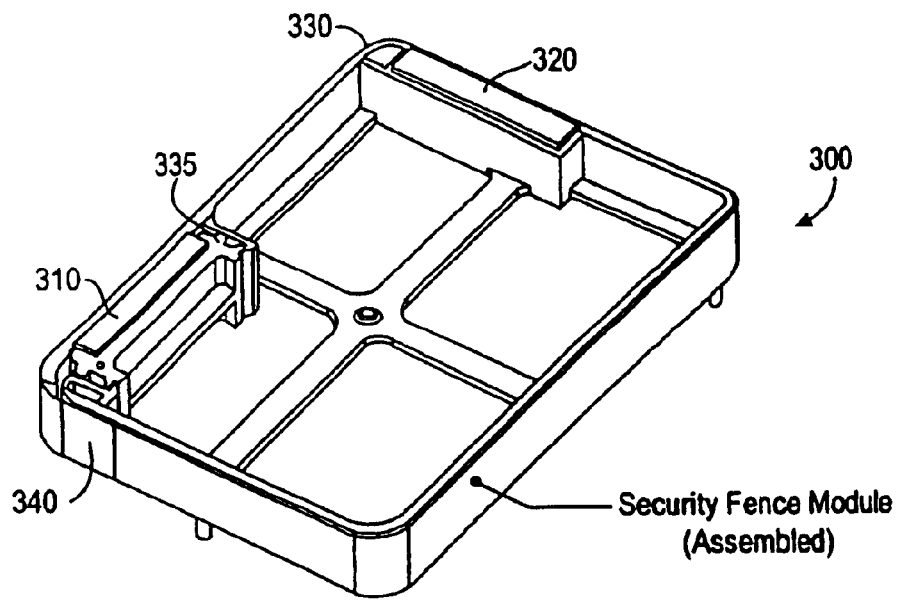
FIG. 3B is a diagram of an assembled security fence module of FIG. 3A.

FIGS. 3A and 3B are diagrams illustrating a security fence module 300, in accordance with an embodiment of the invention. As shown in FIG. 3A, security fence module 300 includes a security shell 330, a connector holder 335, a security film 340, a security film connector 310 and a keypad connector 320. FIG. 3B illustrates how the components of FIG. 3A are assembled to form security fence module 300. First, security film 340 is wrapped around security shell 330 in such a manner than one end of security film 340 is placed on an interior surface of security shell 330. Connector holder 335 is then inserted in security shell 330. Security film connector 310 is inserted in connector holder 335 and is held in contact with security film 340 by a clamping action of connector holder 335 being inserted into the shell. Similarly, keypad connector 320 is inserted within a holder built into security shell 330.

Figure 4B:
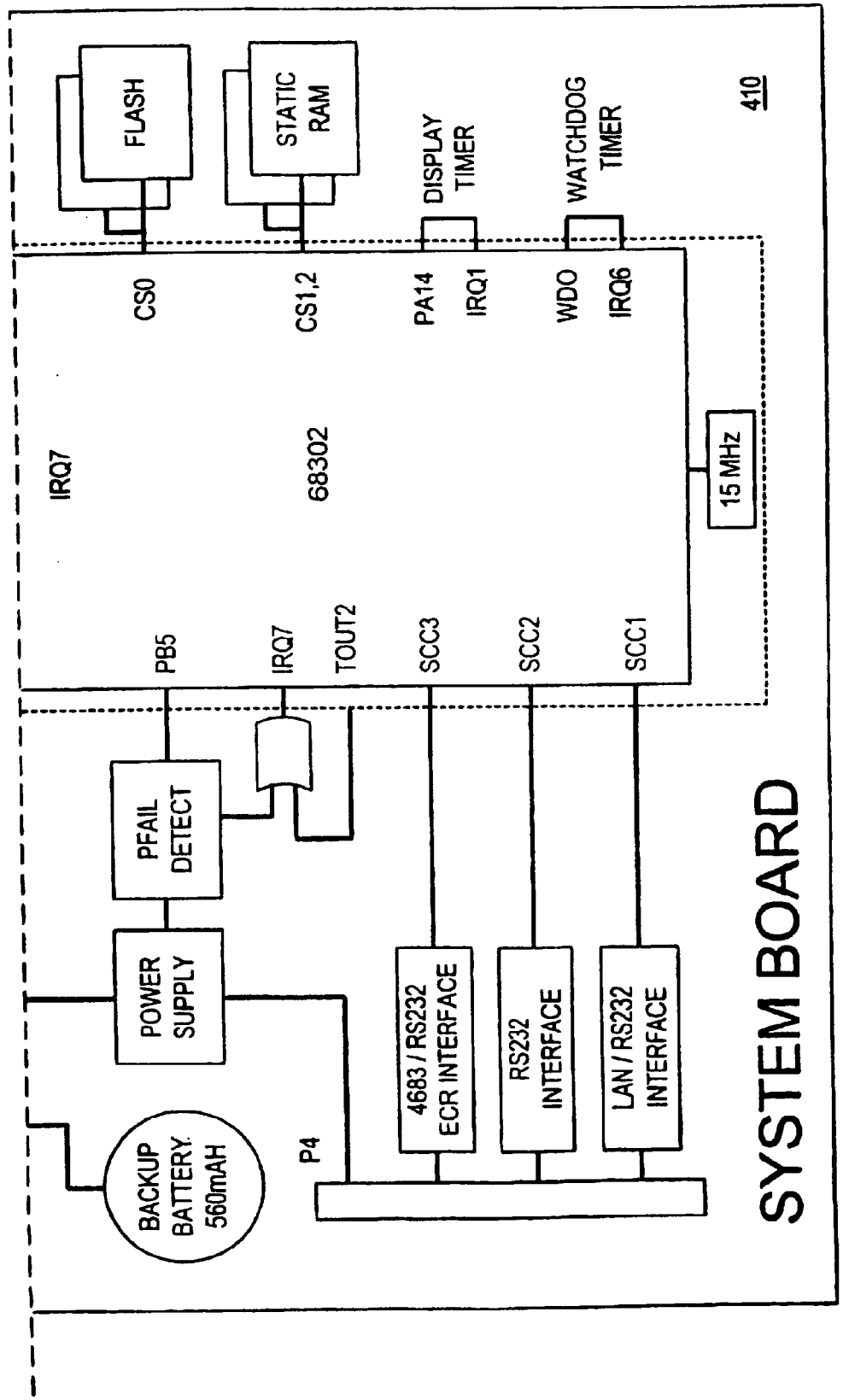

FIGS. 4A and 4B is a block diagram of the circuitry 400 within secure POS terminal 200. Circuitry 400 includes a system board 410 and a display board 420. A tamper detect circuit 460 is provided in part on system board 410 and in part on display board 420. When security film connector 310 is placed between pads 450A and 450B on system board 410 and display board 420, the two portions of tamper detect circuit 460 are electrically connected. Security film connector 310 is shaped such that it can only provide an electrical connection between pads 450A and 450B while the case of POS terminal 200 is closed. When the case is opened, security film connector 310 is no longer in contact with both pads 450A and 450B. As a result, tamper detect circuit 460 is triggered by the interruption of the electrical connection between the two portions of tamper detect circuit 460. In addition, since security film connector 310 also provides an electrical connection with security film 340, if security film 340 is tampered with, tamper detect circuit 460 is also triggered by an interruption in the electrical connection.

In some embodiments, the display portion of tamper detect circuit 460 employs a Maxim MAX933 ultra-low-power comparator to monitor the current through security film 340 and serpentine traces on system board 410 and display board 420. If any of the traces on system board 410 and display board 420 or security film 340 are broken, or if two traces of security film 340 are short circuit together, the output of the comparator would trigger erasing of the on-chip RAM of internal pinpad circuit 490, which renders the circuit non-functional.

Similarly, keypad connector 320 is shaped so as to provide an electrical connection between pads 440A and 440B provided on system board 410 and display board 420 only when the case of POS terminal 200 is closed. Keypad connector 320 further provides an electrical connection between keyboard 470 and processor 480. Since this connection is contained within security fence module 300, the connection between keyboard 470 microprocessor 480 is secured. Thus, both security film connector 310 and keypad connector 320 act as case-open connectors.

During assembly of POS terminal 200, an assembled security fence module 300 (FIG. 3B) is placed between system board 410 and display board 420. As a result, the circuitry encased by system board 410, display board 420, security shell 330 and wire mesh security film 340 cannot be physically accessed without interrupting a circuit connected to tamper detect circuit 460.

As shown in FIGS. 4A and 4B, the circuits protected by security fence module 300 are processor 480, tamper detect circuit 460, internal pinpad circuit 490 and the interface between processor 480 and keyboard 470 provided by keypad connector 320.

In some embodiments of the invention, processor 480 is a Motorola 68302 processor running at 15 MHz. The Motorola 68302 processor is a 32-bit processor with interrupt controller, 1152 bytes of on-chip dual ported RAM, a DMA controller, 3 serial ports, a communications co-processor, 2 parallel ports, 3 timers, an address decoder and bus interface circuitry. The 68032 processor further supports a 24-bit address bus and a selectable 8- or 16-bit data bus. In some embodiments, the 8-bit data bus mode is selected.

In some embodiments, internal pinpad circuit 490 includes an 8 Mhz clock and a Mitsubishi 38207 processor with 16 k bytes MASK ROM, 512 bytes RAM, and 2 k bytes EPROM. When the tamper detection circuit 460 detects an attempt to tamper with the circuitry within POS terminal 200, internal pinpad circuit 490 is disconnected from the power supply via FET and shorted to ground via two additional redundant FET circuits. When this happens, the internal RAM of internal pinpad circuit 490 is erased.

As shown in FIGS. 4A and 4B, POS terminal 200 further includes a 3 track magnetic card reader, a vacuum fluorescent display that can display 2 rows of 16 characters each, where each character is made up by a 5×7 dot matrix, a serial to parallel converter, a 256 k×8-bit flash memory with a maximum access time of 90 nanoseconds that stores operating system software used during the operation of POS terminal 200, a static RAM having a capacity of up to 1 Mbyte with a maximum access time of 70 nanoseconds, a display timer, a watchdog timer, an electronic cash register (ECR) interface, an RS232 interface, a LAN/RS232 interface, a power supply, a power failure detect circuit and a backup battery.

Figure 5A:
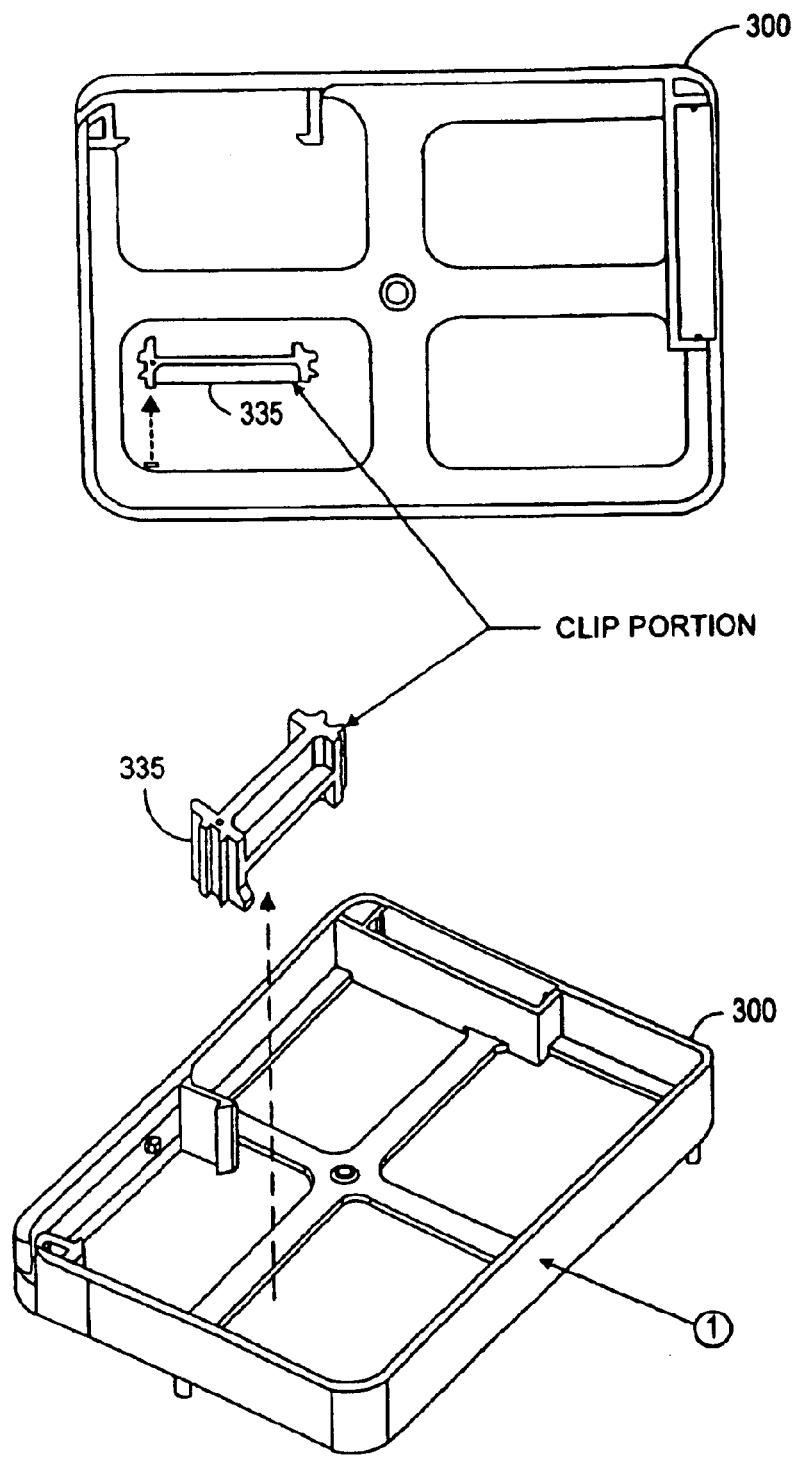
FIGS. 5A–5F illustrate the process of assembling security fence module of FIG. 3A.
Figure 5B:
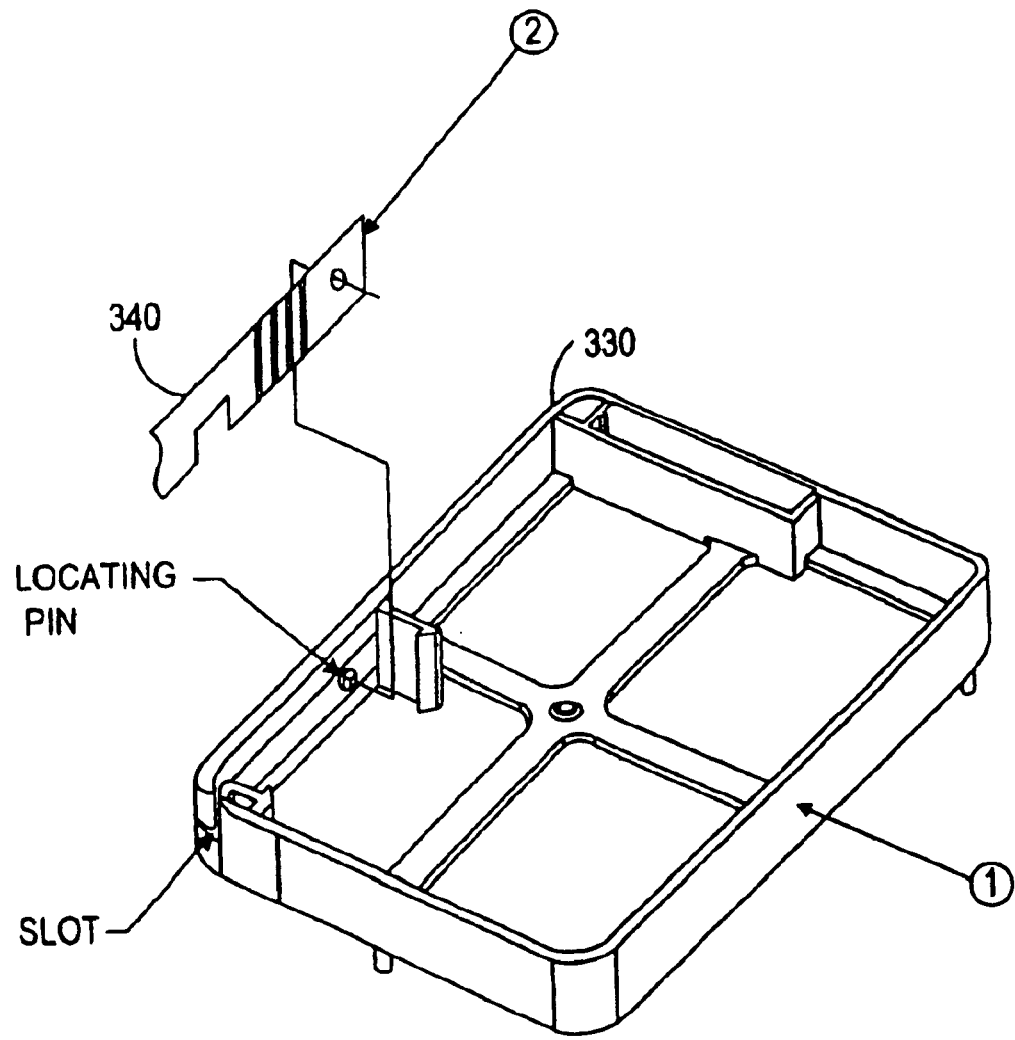
Figure 5C:
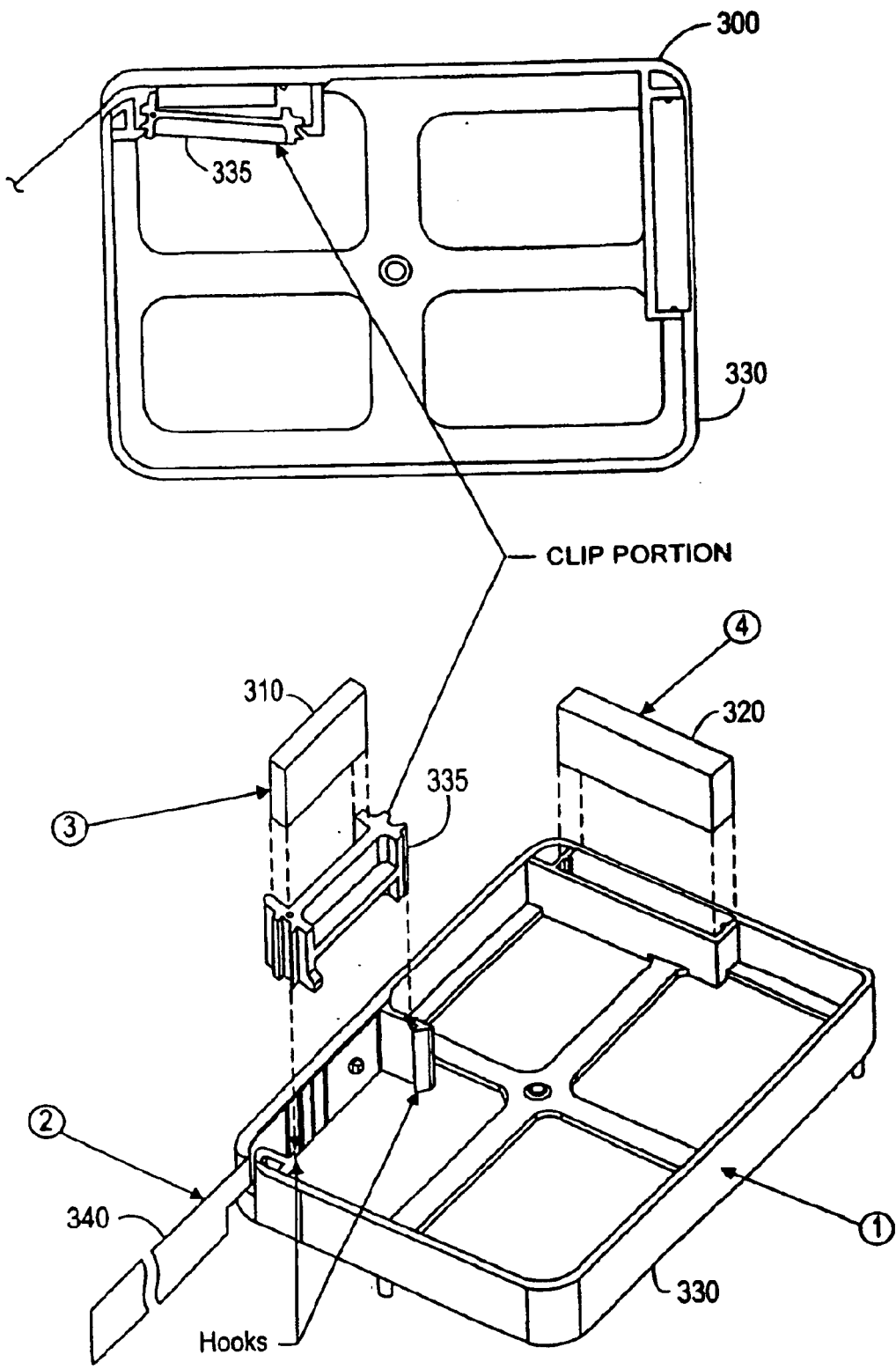
Figure 5D:
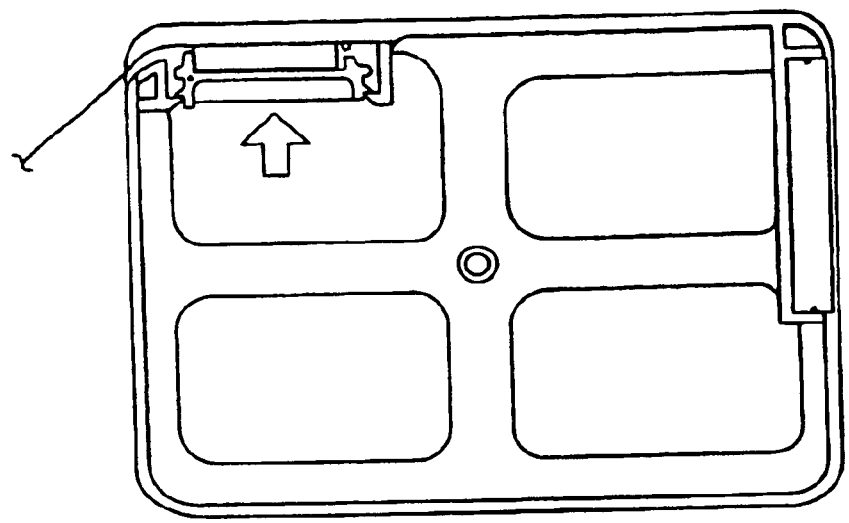
Figure 5D:
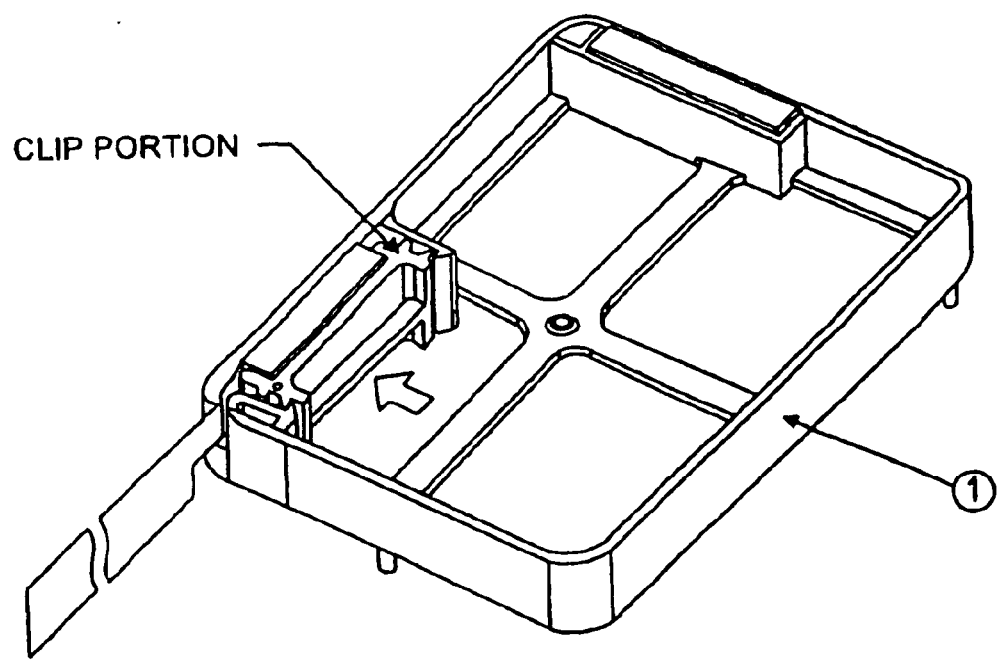
Figure 5E:
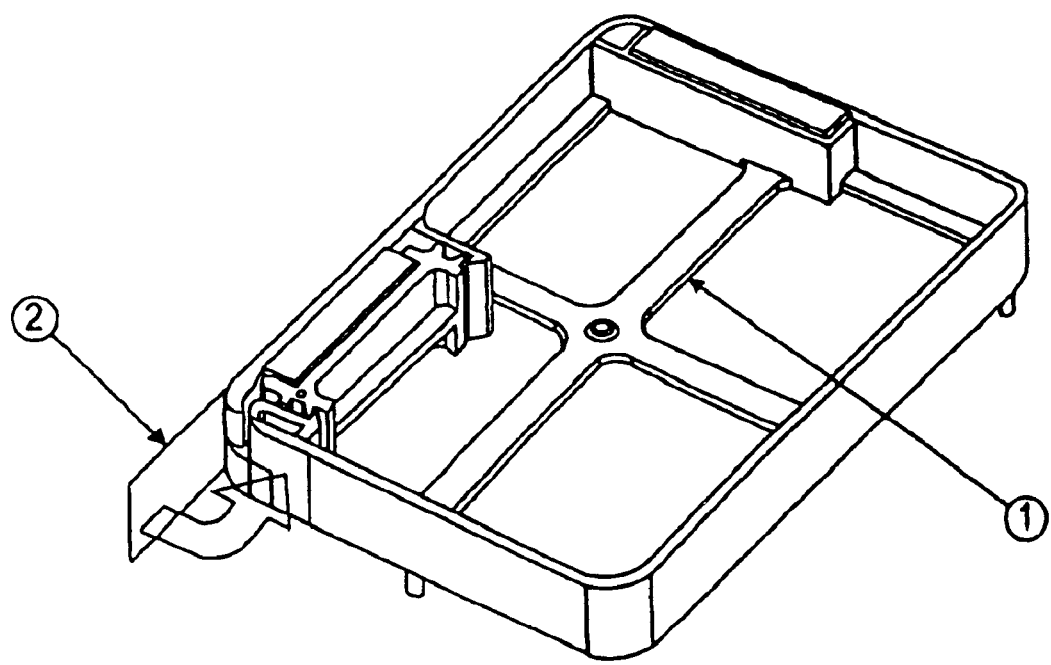
Figure 5F:
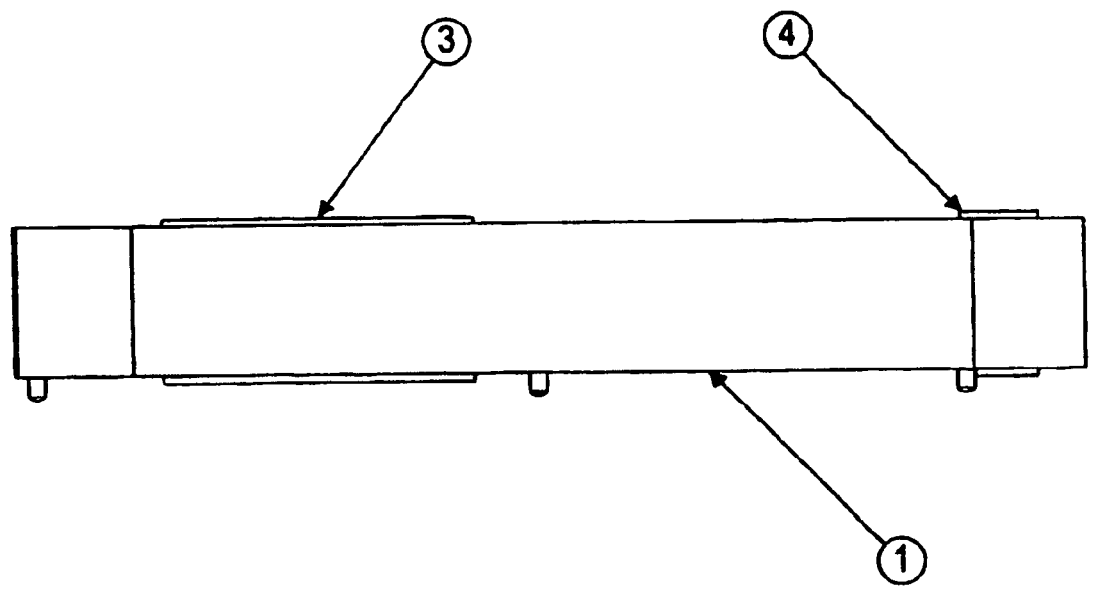

FIGS. 5A–5F illustrate the process of assembling security fence module 300. FIG. 5A shows a single molded plastic structure that includes both security shell 330 and connector holder 335. In step 1, connector holder 335 is separated from security shell 330. In step 2 (FIG. 5B), one end of security film 340 is inserted into security shell 330 using a locating pin to secure it into place. In step 3 (FIG. 5C), connector holder 335 is inserted within security shell 330. Security film connector 310 is then inserted into connector holder 335. Similarly, keypad connector 320 is inserted in a slot of security shell 330. In step 4 (FIG. 5D), connector holder 335 is snapped into place into an appropriate holder provided within security shell 330. In step 5 (FIG. 5E), security film 340 is wrapped around and attached using a self-adhesive film to an outside surface of security shell 330. Finally, in step 6 (FIG. 5F) Security film connector 310 and keypad connector 320 are centered within security shell 330 to form an assembled security fence module 300, as shown in FIG. 3B.

Figure 6:
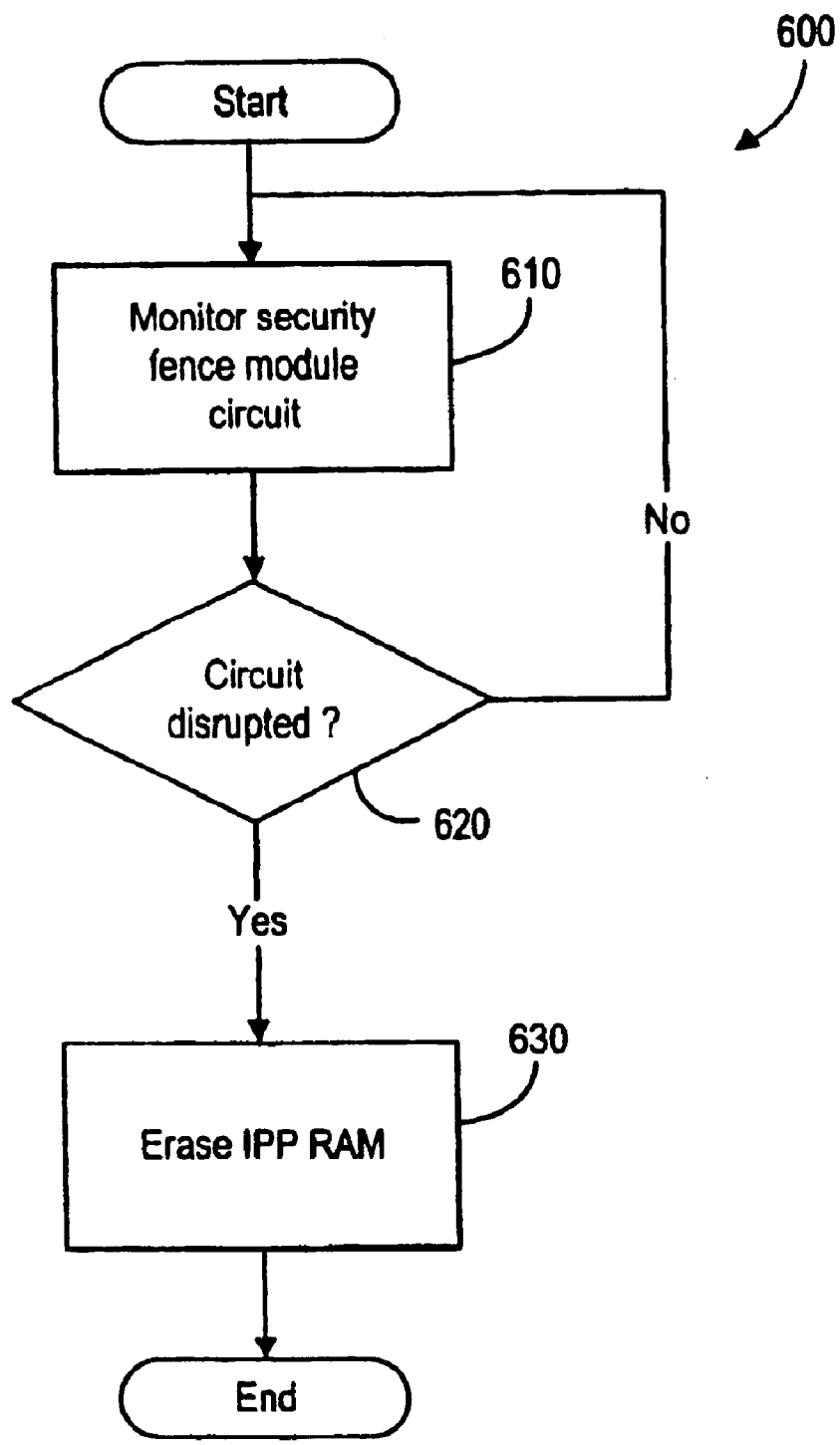
FIG. 6 is a flow diagram of the operation of the tamper detect circuit of FIG. 4A.

FIG. 6 is a flow diagram of the operation 600 of tamper detect circuit 460 (FIG. 4A). Initially, in stage 610, tamper detect circuit monitors the current in the circuit contained in security fence module 300 e.g. by comparing a detected voltage level to a preset level). Stage 620 then determines whether the circuit has been disrupted, in which case operation 600 proceeds to stage 630. Otherwise, stages 610 and 620 are repeated until a disruption in the circuit is detected. In stage 630, the on-chip RAM of internal pinpad circuit 490 is erased to prevent unauthorized access to the information stored therein and render the pinpad circuitry non-operational.

In some embodiments, the security system described above is used to protect sensitive circuits in devices other than a POS terminal. In fact, the security system of the present invention can be used to protect any type of electronic circuitry that stores sensitive and/or confidential information during operation and that may be tampered with. In such embodiments, a security fence module is provided that is shaped to conform to the circuits or portions of circuits to be protected by the security system. A tamper detection circuit is employed to monitor a voltage within a circuit contained in the security fence module and appropriate security measures are taken in the event tampering with the security fence module is detected.

Embodiments described above illustrate but do not limit the invention. For example, connectors other than elastomeric connectors could be used in place of the elastomeric connectors described herein. Furthermore, the invention is not limited to any specific shape or placement of the security fence module. Numerous modifications and variations are possible in accordance to the principles of the present invention, as described by the following claims.

We claim:

1. An apparatus for providing security to an electronic circuit case, comprising:
   a first circuit board;
   a second circuit board;
   a first contact pad and a second contact pad, wherein each of the first contact pad and the second contact pad is provided on the first circuit board and on the second circuit board;
   a connector configured to provide an electrical connection between the first circuit board and second circuit board when the electronic circuit case is closed and the connector is placed between the first contact pad and the second contact pad so that the first contact pad is in electrical connection with the second contact pad, and configured to interrupt the electrical connection between the first circuit board and second circuit board when the electronic circuit case is opened and the connector is not in contact with the first contact pad and the second contact pad so that the first contact pad is not in electrical connection with the second contact pad;
   a protective casing interposed between the first and the second circuit boards;
   a flexible conductive film coupled on the outside of the protective casing, wherein the tamper detection circuit detects whether integrity of the flexible conductive film has been compromised; and
   a tamper detection circuit configured to trigger a security response, when there is interruption in the electrical connection between the first circuit board and second circuit board.

2. The apparatus of claim 1, further comprising:
   wherein the flexible conductive film is wrapped around the protective casing, and wherein the tamper detection circuit detects whether the integrity of the flexible conductive film has been compromised.

3. The apparatus of claim 2, wherein the flexible conductive film is connected to the electrical connector.

4. The apparatus of claim 1, further comprising a second electrical connector in contact with the first and the second circuit boards.

5. The apparatus of claim 4, further comprising:
   a third contact pad and a fourth contact pad, wherein each of the third contact pad and the fourth contact pad is provided on the first circuit board and on the second circuit board;
   wherein the second connector is configured to provide an electrical connection between the first circuit board and second circuit board when the electronic circuit case is closed and the second connector is placed between the third contact pad and the fourth contact pad so that the third contact pad is in electrical connection with the fourth contact pad, and is configured to interrupt the electrical connection between the first circuit board and second circuit board when the electronic circuit case is opened and the second connector is not in contact with the third contact pad and the fourth contact pad so that the third contact pad is not in electrical connection with the fourth contact pad.

6. The apparatus of claim 1, wherein the contact pads provide an electrical path between the first circuit board and the electrical connector during operation of the electronic circuit.

7. The apparatus of claim 1, wherein the contact pads provide an electrical path between the second circuit board and the electrical connector during operation of the electronic circuit.

8. The apparatus of claim 1, wherein the electrical connector comprises an elastomeric material.

9. The apparatus of claim 1, wherein the electrical connector comprises a conductive layer of silicone.

10. The apparatus of claim 9, wherein the conductive layer of silicone contains carbon fibers.

11. The apparatus of claim 1, wherein the electrical connector comprises a non-conductive layer of silicone.

12. The apparatus of claim 1, wherein the tamper detect circuit comprises a voltage comparator.

13. The apparatus of claim 1, wherein the flexible conductive film is connected to the electrical connector.

14. The apparatus of claim 1, wherein the security system is part of a secure point of sale (POS) terminal.

15. The apparatus of claim 1, wherein:
   the flexible conductive film is coupled to the connector and configured to interrupt the electrical connection between the first circuit board and second circuit board when the flexible conductive film is tampered.

16. A method for securing information in an electronic circuit in an electronic circuit case, the method comprising:
   monitoring a current through a circuit coupled to a tamper detect circuit, the circuit comprising a first circuit board and a second circuit board;
   determining based on the monitoring whether the electronic circuit is being tampered with, wherein tampering with the electronic circuit is detected when electrical connection is interrupted between a first contact pad and a second contact pad, where the first contact pad and the second contact pad are disposed on the first circuit board and on the second circuit board; and
   erasing or, alternatively, corrupting information stored in the electronic circuit in response to detecting tampering with the electronic circuit;
   wherein the circuit further comprises:
   a protective casing interposed between the first and the second circuit boards; and a flexible conductive film wrapped around the protective casing; and wherein the method further comprises detecting whether the integrity of the flexible conductive film has been compromised.

17. The method of claim 16, wherein the circuit further comprises:

a first electrical connector in contact with the first and the second circuit boards; and wherein the tamper detection circuit is coupled to the first electrical connector and detects whether the first electrical connector is in contact with both the first and the second circuit boards.

18. The method of claim 17, wherein the circuit further comprises a second electrical connector in contact with the first and the second circuit boards.

19. The method of claim 17, wherein the first circuit board further comprises contact pads that provide an electrical path between the first circuit board and the first electrical connector during operation of the electronic circuit.

20. The method of claim 17, wherein the second circuit board further comprises contact pads that provide an electrical path between the second circuit board and the first electrical connector during operation of the electronic circuit.

21. The method of claim 17, wherein the first electrical connector comprises an elastomeric material.

22. The method of claim 21, wherein the first electrical connector further comprises a non-conductive layer of silicone.

23. The method of claim 17, wherein the first electrical connector comprises a conductive layer of silicone.

24. The method of claim 23 wherein the conductive layer of silicone contains carbon fibers.

25. The method of claim 16, wherein the flexible conductive film is connected to the first electrical connector.

26. The method of claim 16, wherein the tamper detect circuit comprises a voltage comparator to determine whether the electrical circuit is being tampered with.

27. The method of claim 16, further comprising:

disconnecting a memory for storing the information from a power source; and grounding the memory power input.

28. The method of claim 16, wherein the electronic circuit is part of a secure POS terminal.

29. An apparatus for providing security to an electronic circuit, comprising:

a first circuit board;

a second circuit board; and a security fence module disposed between the first circuit board and second circuit board and configured to trigger a security response when the security fence module is penetrated and electrical connection between the first circuit board and the second circuit board is interrupted due to penetration of the security fence module.

30. The apparatus of claim 29, further comprising:

a security film coupled to the security fence module and configured to interrupt the electrical connection between the first circuit board and second circuit board when the security film is tampered.

31. The apparatus of claim 30, further comprising:

a tamper detection circuit protected by the security fence module and configured to trigger when the electrical connection between the first circuit board and second circuit board is interrupted.

32. A method for providing security to an electronic circuit case, comprising:

providing an electrical connection between a first circuit board and a second circuit beard when the electronic circuit case is closed by placing a connector between a first contact pad and a second contact pad, wherein the first contact pad and the second contact pad are on the first circuit board and the second circuit board, so that the first contact pad is in electrical connection with the second contact pad, and interrupting the electrical connection between the first circuit board and second circuit board when the electronic circuit case is opened by disconnecting the connector from the first contact pad and the second contact pad so that the first contact pad is not in electrical connection with the second contact pad;

interrupting the electrical connection between the first circuit board and second circuit board when a security film coupled to an electrical connector between the first circuit board and the second circuit board is tampered; and triggering a security response from a tamper detection circuit, when there is interruption in the electrical connection between the first circuit board and second circuit board.

33. An apparatus for providing security to an electronic circuit case, comprising:

a first circuit board;

a second circuit board;

a first contact pad and a second contact pad, wherein each of the first contact pad and the second contact pad is provided on the first circuit board and on the second circuit board;

a tamper detect circuit provided on the first circuit board and the second circuit board;

a protective casing interposed between the first and the second circuit boards;

a flexible conductive film coupled on the outside of the protective casing, wherein the tamper detection circuit detects whether integrity of the flexible conductive film has been compromised; and a connector configured to be placed between the first contact pad and the second contact pad so that there is electrical connection in the tamper detect circuit, and configured to be disconnected from the first contact pad and the second contact pad so that there is no electrical connection in the tamper detect circuit;

wherein the tamper detect circuit is configured to trigger a security response, when there is no electrical connection in the tamper detect circuit.

34. The apparatus of claim 33, wherein the tamper detect circuit comprises a first tamper detect circuit portion and a second tamper detect circuit portion; wherein the connector is configured to be placed between the first contact pad and the second contact pad so that there is electrical connection between the first tamper detect circuit portion and the second tamper detect circuit portion; and wherein the connector is configured to be disconnected from the first contact pad and the second contact pad so that there is no electrical connection between the first tamper detect circuit portion and the second tamper detect circuit portion.

35. The apparatus of claim 33, wherein:

the flexible conductive film is wrapped around the protective casing, wherein the tamper detection circuit detects whether the integrity of the flexible conductive film has been compromised.

36. The apparatus of claim 35, wherein the flexible conductive film is connected to the electrical connector.

37. The apparatus of claim 33, further comprising a second electrical connector in contact with the first and the second circuit boards.

38. The apparatus of claim 33, wherein the contact pads provide an electrical path between the first circuit board and the electrical connector during operation of the electronic circuit.

39. The apparatus of claim 33, wherein the contact pads provide an electrical path between the second circuit board and the electrical connector during operation of the electronic circuit.

40. The apparatus of claim 33, wherein the electrical connector comprises an elastomeric material.

41. The apparatus of claim 33, wherein the electrical connector comprises a conductive layer of silicone.

42. The apparatus of claim 41, wherein the conductive layer of silicone contains carbon fibers.

43. The apparatus of claim 33, wherein the electrical connector further comprises a non-conductive layer of silicone.

44. The apparatus of claim 33, wherein the tamper detect circuit comprises a voltage comparator.

45. The apparatus of claim 33, wherein the security system is part of a secure point of sale (POS) terminal.

46. An apparatus for providing security to an electronic circuit, comprising:
- a first circuit board;
- a second circuit board;
- a tamper detect circuit provided on the first circuit board and on the second circuit board; and
- a security fence module disposed between the first board and second board and configured to trigger a security response when the security fence module is penetrated and electrical connection in the tamper detect circuit is interrupted due to penetration of the security fence module.

47. The apparatus of claim 46, further comprising:
- a security film coupled to the security fence module and configured to interrupt the electrical connection in the tamper detect circuit when the security film is tampered.

48. The apparatus of claim 46, wherein the tamper detect circuit is configured to trigger when the electrical connection in the tamper detect circuit is interrupted.

49. An apparatus for providing security to an electronic circuit case, comprising:
- a first circuit board;
- a second circuit board;
- a connector configured to provide an electrical connection between the first circuit board and second circuit board when the electronic circuit case is closed to interrupt the electrical connection between the first circuit board and second circuit board when the electronic circuit case is opened;
- a tamper detection circuit configured to trigger a security response, when there is interruption in the electrical connection between the first circuit board and second circuit board;
- a protective casing interposed between the first and the second circuit boards; and
- a flexible conductive film wrapped around the protective casing, wherein the tamper detection circuit detects whether the integrity of the flexible conductive film has been compromised.

50. The apparatus of claim 49, wherein the flexible conductive film is connected to the electrical connector.

51. An apparatus for providing security to an electronic circuit case, comprising:
- a first circuit board;
- a second circuit board;
- a connector configured to provide an electrical connection between the first circuit board and second circuit board when the electronic circuit case is closed to interrupt the electrical connection between the first circuit board and second circuit board when the electronic circuit case is opened;
- a tamper detection circuit configured to trigger a security response, when there is interruption in the electrical connection between the first circuit board and second circuit board;
- a protective casing interposed between the first and the second circuit boards; and
- a flexible conductive film coupled on the outside of the protective casing, wherein the tamper detection circuit detects whether integrity of the flexible conductive film has been compromised.

52. The apparatus of claim 51, wherein the flexible conductive film is connected to the electrical connector.

53. A method for providing security to an electronic circuit case, comprising:
- providing an electrical connection between a first circuit board and a second circuit board when the electronic circuit case is closed, and interrupting the electrical connection between the first circuit board and second circuit board when the electronic circuit case is opened;
- triggering a security response from a tamper detection circuit, when there is interruption in the electrical connection between the first circuit board and second circuit board; and
- interrupting the electrical connection between the first circuit board and second circuit board when a security film coupled to an electrical connector between the first circuit board and the second circuit board is tampered.

54. An apparatus for providing security to an electronic circuit case, comprising:
- a first circuit board;
- a second circuit board;
- a first contact pad and a second contact pad, wherein each of the first contact pad and the second contact pad is provided on the first circuit board and on the second circuit board;
- a connector configured to provide an electrical connection between the first circuit board and second circuit board when the electronic circuit case is closed and the connector is placed between the first contact pad and the second contact pad so that the first contact pad is in electrical connection with the second contact pad, and configured to interrupt the electrical connection between the first circuit board and second circuit board when the electronic circuit case is opened and the connector is not in contact with the first contact pad and the second contact pad so that the first contact pad is not in electrical connection with the second contact pad;
- a tamper detection circuit configured to trigger a security response, when there is interruption in the electrical connection between the first circuit board and second circuit board; and
- a security film coupled to the connector and configured to interrupt the electrical connection between the first circuit board and second circuit board when the flexible conductive film is tampered.

* * * * *

UNITED STATES PATENT AND TRADEMARK OFFICE
CERTIFICATE OF CORRECTION

PATENT NO. : 6,917,299 B2
APPLICATION NO. : 10/377188
DATED : July 12, 2005
INVENTOR(S) : Shuzhen Fu et al.

It is certified that error appears in the above-identified patent and that said Letters Patent is hereby corrected as shown below:

On the title page, in field (56), under "U.S. PATENT DOCUMENTS", in column 1, line 1, below "3,772,674 A * 11/1973 Jackson ................... 206/459.1"
       3,882,323     05/1975     Gary Smolker insert -- 3,982,320     09/1976     Buchoff, et al. --.

On the title page, in field (56), under "U.S. PATENT DOCUMENTS", in column 1, line 3, below "4,593,384 A 6/1986 Kleijne"
       4,811,288     03/1989     Kleijne, et al.

4,849,927     07/1989     Gerardus J.F. Vos 4,860,351     08/1989     Steve H. Weingart insert -- 4,882,752     11/1989     Lindman, et al. --.

On the title page, in field (56), under "U.S. PATENT DOCUMENTS", in column 1, line 6, below "5,233,505 A 8/1993 Chang et al."
       5,298,884     03/1994     Gilmore, et al.

insert -- 5,627,520     05/1997     Grubbs, et al. --.

On the title page, in field (56), in column 2,
       FOREIGN PATENT DOCUMENTS

EP          0924592 A2    6/1999
below "WO    WO99/40501        12/1999",
                              OTHER PUBLICATIONS "Everest Plus" by VeriFone. Inc., 2 pages
     "VeriFone Introduces EverestPlus, A New and Improved POS Solution For
     Multi-Lane Merchants", webpages [online], VeriFone, Inc., Yahoo! Finance.
     Retrieved from the internet:
insert -- <http://biz.yahoo.com/bw/000117/ny verifon_1.htm, [retrieved on 2000/8/2].
     Total pages: 2. --.

UNITED STATES PATENT AND TRADEMARK OFFICE
CERTIFICATE OF CORRECTION

PATENT NO. : 6,917,299 B2
APPLICATION NO. : 10/377188
DATED : July 12, 2005
INVENTOR(S) : Shuzhen Fu et al.

It is certified that error appears in the above-identified patent and that said Letters Patent is hereby corrected as shown below:

In column 7, line 39, in Claim 26, delete "electrical" and insert -- electronic --, therefor.

In column 8, line 4, in Claim 32, delete "beard" and insert -- board --, therefor.

In column 9, lines 32-33, in Claim 46, delete "first board and second board" and insert -- first circuit board and second circuit board --, therefor.

Signed and Sealed this

Eleventh Day of August, 2009

David J. Kappos
*Director of the United States Patent and Trademark Office*